US012780204B2

(12) United States Patent
Digman

(10) Patent No.: US 12,780,204 B2
(45) Date of Patent: Nov. 3, 2026

(54) SYSTEM AND METHOD FOR CONTROLLING THE OPERATION OF AN AGRICULTURAL IMPLEMENT

(71) Applicant: CNH Industrial America LLC, New Holland, PA (US)

(72) Inventor: Michael Jacob Digman, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/659,082

(22) Filed: May 9, 2024

(65) Prior Publication Data

US 2025/0346232 A1 Nov. 13, 2025

(51) Int. Cl.
*B60W 30/18* (2012.01)
*A01B 69/04* (2006.01)
*B60W 10/08* (2006.01)

(52) U.S. Cl.
CPC ..... *B60W 30/18127* (2013.01); *A01B 69/008* (2013.01); *B60W 10/08* (2013.01); *B60W 2300/15* (2013.01)

(58) Field of Classification Search
CPC ........................ B60W 30/18127; B60W 10/08
See application file for complete search history.

(56) References Cited

U.S. PATENT DOCUMENTS 9,232,688 B2 1/2016 Kormann et al.
10,814,875 B2 * 10/2020 Thompson ...... B60W 30/18127
10,959,365 B2 * 3/2021 Zemenchik ............ A01B 76/00
2014/0277675 A1 * 9/2014 Anderson .............. A01B 69/00
700/114

FOREIGN PATENT DOCUMENTS

EP 3232760 B1 4/2019
GB 2537860 A * 11/2016 ........... B64C 25/405

* cited by examiner

*Primary Examiner* — George C Jin
(74) *Attorney, Agent, or Firm* — Dority & Manning, P.A.

(57) ABSTRACT

A system for controlling the operation of an agricultural implement includes a vehicle wheel, an agricultural implement configured to be towed by the work vehicle and including an implement wheel, a regenerative brake assembly including an energy storage device and configured to steer the implement and to generate electrical power supplied to the energy storage device, and a computing system communicatively coupled to the brake assembly. The computing system is configured to receive an input of a selected position for the implement to be steered as the implement moves in the direction of travel and control an operation of the brake assembly to steer the implement to the selected position. Furthermore, the electrical power supplied to the energy storage device is generated by the brake assembly as the brake assembly steers the implement to the selected position.

15 Claims, 5 Drawing Sheets

SYSTEM AND METHOD FOR CONTROLLING THE OPERATION OF AN AGRICULTURAL IMPLEMENT

FIELD OF THE INVENTION

The present disclosure generally relates to agricultural implements and, more particularly, to systems and methods for controlling the operation of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In certain configurations, tillage implements include one or more ground-engaging tools, such as shanks and/or spaced apart disks, supported on its frame. Each ground-engaging tool of the tillage implement loosens and/or otherwise agitates the soil to prepare the field for subsequent planting operations.

During operations, while being towed, the tillage implement may need to be steered from its current position to a new position. For example, in some scenarios, the tillage implement may drift from its intended or selected position, such as when it is towed across a hill in which the tillage implement drifts or slides down as it is being towed. The tillage implement not being in the selected position may negatively impact tilling operations by, for example, leading to under tilling and/or over tilling of portions of the field. In other scenarios, the tillage implement may need to be moved to a new selected position from its initial selected position to avoid adverse field conditions, such as wet or muddy soil. Additionally, correction of the implement position may require significant energy consumption and lead to energy inefficiencies. In this respect, systems and methods have been developed to reduce these issues. While such systems and methods work well, further improvements are needed.

Accordingly, an improved system and method for controlling the operation of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural machine. The agricultural machine includes a work vehicle including a vehicle wheel configured to move the work vehicle in a direction of travel. Additionally, the agricultural machine includes an agricultural implement configured to be towed by the work vehicle in the direction of travel. The agricultural implement includes an implement wheel configured to move the agricultural implement in the direction of travel. Additionally, the agricultural machine includes a regenerative brake assembly including an energy storage device. The regenerative brake assembly is configured to steer the agricultural implement and to generate electrical power supplied to the energy storage device. Moreover, the electrical power supplied to the energy storage device is generated by the regenerative brake assembly as the regenerative brake assembly steers the agricultural implement.

In another aspect, the present subject matter is directed to a system for controlling the operation of an agricultural implement. The system includes a vehicle wheel of a work vehicle configured to move the work vehicle in a direction of travel. Additionally, the system includes an agricultural implement configured to be towed by the work vehicle in the direction of travel. The agricultural implement includes an implement wheel configured to move the agricultural implement in the direction of travel. Additionally, the system includes a regenerative brake assembly including an energy storage device. The regenerative brake assembly is configured to steer the agricultural implement and to generate electrical power supplied to the energy storage device. Moreover, the system includes a computing system communicatively coupled to the regenerative brake assembly. The computing system is configured to receive an input of a selected position for the agricultural implement to be steered to as the agricultural implement moves in the direction of travel. Additionally, the computing system is configured to control an operation of the regenerative brake assembly to steer the agricultural implement to the selected position. Furthermore, the electrical power supplied to the energy storage device is generated by the regenerative brake assembly as the regenerative brake assembly steers the agricultural implement to the selected position.

In a further aspect, the present subject matter is directed to a method for controlling the operation of an agricultural implement. The method includes receiving, with a computing system, an input of a selected position for an agricultural implement to be steered to as the agricultural implement moves in a direction of travel. Additionally, the method includes controlling, with the computing system, an operation of a regenerative brake assembly to brake an implement wheel of the agricultural implement to steer the agricultural implement to the selected position.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
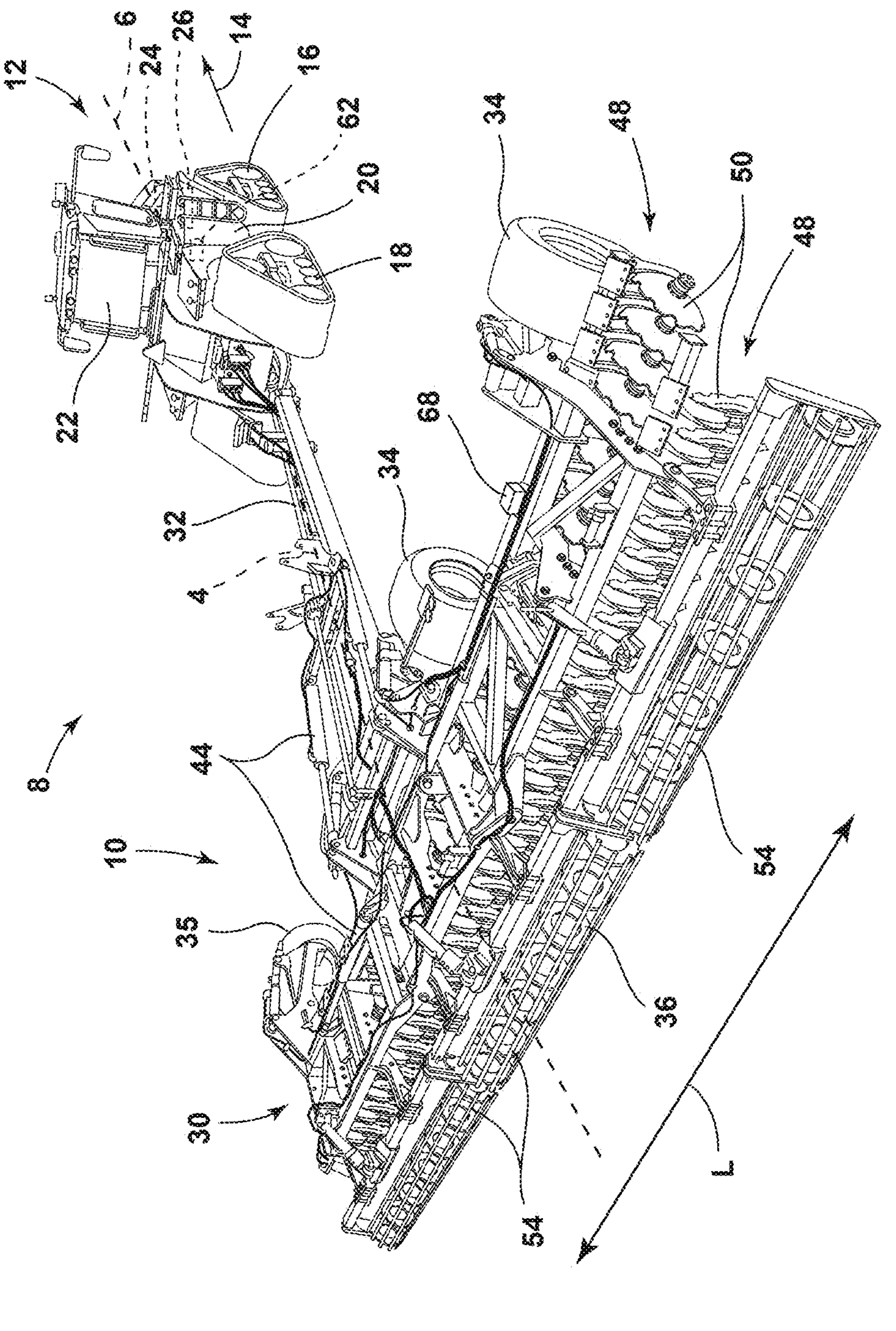
FIG. 1 illustrates a perspective view of one embodiment of an agricultural machine in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for controlling the operation of an agricultural implement of an agricultural machine. As will be described below, the agricultural machine generally includes a work vehicle having one or more vehicle wheels. The agricultural machine also includes an agricultural implement configured to be towed by the work vehicle. The agricultural implement includes a first implement wheel and a second implement wheel configured to move the agricultural implement.

In several embodiments, the agricultural machine also includes a regenerative brake assembly including an energy storage device, such as a chargeable battery. The regenerative brake assembly is configured to steer the agricultural implement and generate electrical power supplied to the energy storage device. For example, the regenerative brake assembly may be configured to brake the first and the second implement wheels independently of each other to steer the agricultural implement. The electrical power supplied to the energy storage device is generated by the regenerative brake assembly as it steers the agricultural implement. Additionally, in some embodiments, the regenerative brake assembly includes an electric motor configured to drive the implement wheel and electrically coupled to the energy storage device for receiving the electrical power from the energy storage device.

Additionally, in several embodiments, a computing system of the disclosed system is configured to control the operation of the regenerative brake assembly to steer the agricultural implement to a selected position. More specifically, the computing system is configured to receive an input of a selected position for the agricultural implement to be steered to and control the operation of the regenerative brake assembly to steer the agricultural implement to the selected position. In some embodiments, the computing system may be configured to receive an input of a selected position for the agricultural implement to be steered to in which a longitudinal centerline of the agricultural implement is aligned with a longitudinal centerline of the work vehicle. Additionally, or alternatively, in some embodiments, the computing system may determine the selected position for the agricultural implement to be steered based on data generated by a wheel slip sensor and/or data generated by a terrain slope sensor.

Controlling an operation of a regenerative brake assembly to steer an agricultural implement improves the operation of the agricultural implement. More specifically, during operations, the agricultural implement may need to move from its current position to a new position. For example, the implement may drift from the intended or selected position and/or need to avoid adverse field conditions and, thus, need to move. Correction of the implement position may require significant energy consumption, such as from the engine of the work vehicle, to adjust the position of the implement and, thus, create energy inefficiencies. As described above, the disclosed agricultural machine utilizes a regenerative brake assembly in combination with a computing system to independently brake the wheels of the implement to steer the implement to a selected position. The selected position may be a received input, such as an operator input, or may be determined according to the relative positioning of the centerlines of the work vehicle and implement, wheel slip of the work vehicle which may be indicative of adverse (e.g., muddy) field conditions, and/or the like. Additionally, braking the wheels of the implement independently of each other and, thus, steering of the implement, results in generated electrical power supplied to an energy storage device (e.g., chargeable battery) of the regenerative brake assembly for later use. The generated electrical power, for example, may be utilized by electrical motors of the regenerative brake assembly to drive the implement wheels. As such, controlling an operation of the regenerative brake assembly allows the implement to be steered to a new position while simultaneously generating electrical power to be utilized to drive the wheels of the implement and, thus, reduces the energy needed to move the implement to the new position.

Referring now to the drawings, FIG. 1 illustrates a perspective view of the agricultural machine 8, with an agricultural implement 10 of the agricultural machine 8 configured as a tillage implement, coupled to a work vehicle 12 of the agricultural machine 8.

In general, the implement 10 may be configured to be towed across a field in a direction of travel (e.g., as indicated by arrow 14) by the work vehicle 12. As shown, the implement 10 is configured as a speed tillage implement and includes an implement longitudinal centerline 4 extending in a longitudinal direction L, and the work vehicle 12 is configured as an agricultural tractor including a vehicle longitudinal centerline 6. However, in other embodiments, the implement 10 may be configured as any other suitable type of tillage implement or other agricultural implement. Similarly, the work vehicle 12 may be configured as any other suitable type of vehicle.

As shown in FIG. 1, the work vehicle 12 may include one or more vehicle wheels, such as a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 220 shown in FIG. 4) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIG. 1, the implement 10 may generally include an implement frame 30 configured to be towed by the work vehicle 12 via a pull hitch or tow bar 32 in the travel direction 14. The implement frame 30 may include aft extending implement frame members 36 coupled to the tow bar 32. Furthermore, a plurality of implement wheels, such as a first implement wheel 34 and a second implement wheel 35, may be coupled to the implement frame 30 to facilitate towing the implement 10 in the direction of travel 14. The first implement wheel 34 and the second implement wheel 35 may be spaced apart from one another on the implement 10 in a lateral direction L perpendicular to the direction of travel 14.

In general, the implement frame 30 may support a plurality of ground-engaging tools. The various ground-engaging tools may be configured to perform an agricultural operation, such as a tillage operation or any other suitable ground-engaging operation, across the field along which the implement 10 is being towed. For example, in one embodiment, the implement frame 30 may support various gangs or sets 48 of disk blades 50. Specifically, the disk blades 50 are spaced apart from each other along the length of the disk gang 48 and configured to rotate relative to the soil within the field as the agricultural implement 10 travels across the field in the travel direction 14. Furthermore, each disk blade 50 may include both a concave side (not shown) and a convex side (not shown). In addition, the various gangs 48 of disk blades 50 may be oriented at an angle relative to the travel direction 14 to promote more effective tilling of the soil.

Moreover, in one embodiment, the implement frame 30 may be configured to support a plurality rolling (or crumbler) basket assemblies 54. However, in other embodiments, any other suitable ground-engaging tools may be coupled to and supported by the implement frame 30, such as a plurality of shanks, tines, spikes, and/or the like.

Additionally, in several embodiments, the implement 10 may include one or more actuators 44 (one is shown), such as a hydraulic actuator(s). In general, each actuator(s) 44 is configured to adjust the position of the implement frame 30 and/or subframes of the implement 10 to adjust a position of the ground-engaging tools relative to the field. For example, in some embodiments the actuator(s) 44 may be configured to adjust the soil penetration depth of the ground-engaging tools. As such, the actuator(s) 44 may raise the implement frame 30 to decrease the soil penetration depth of the ground-engaging tools and/or lower the implement frame 30 to increase the soil penetration depth of the ground-engaging tools. However, it should be appreciated that the actuator(s) 44 may be configured to adjust the position of the ground-engaging tools in any other suitable manner. For example, the actuator(s) 44 may be configured to adjust a lateral and/or longitudinal position of the ground-engaging tools.

The configuration of the implement 10 and the work vehicle 10 of the agricultural machine 8 described above and shown in FIG. 1 is provided only to place the present subject matter in an exemplary field of use. Thus, the present subject matter may be readily adaptable to any manner of implement and/or vehicle configuration.

As particularly shown in FIG. 1, one or more wheel slip sensors 62 may be positioned on the agricultural machine 8. In general, the wheel slip sensor(s) 62 is configured to generate data indicative of the occurrence of wheel slip of one or more of the vehicle wheels/track assemblies 16, 18 of the work vehicle 12 of the agricultural machine 8 relative to the ground. Such wheel slip results when the wheel(s)/track assembly(ies) 16, 18 of the work vehicle 12 experience rotational motion with limited or no corresponding translational motion. The data generated by the wheel slip sensor(s) 62 may, in turn, subsequently be used to determine a selected position for the implement 10 to be steered to.

In general, the wheel slip sensor(s) 62 may correspond to any suitable sensing device(s) configured to generate data indicative of the occurrence of wheel slip of the vehicle wheel(s)/track assembly(ies) 16, 18 of the work vehicle 12 relative to the ground. For example, in one embodiment, the wheel slip sensor(s) 62 may correspond to a proximity sensor(s). However, in alternative embodiments, the wheel slip sensor(s) 62 may correspond to any other suitable sensing device(s) such as an imaging device(s) and/or the like.

Furthermore, any number of wheel slip sensor(s) 62 may be positioned on the agricultural machine 8 and configured to generate data indicative of the occurrence of wheel slip of the wheel(s)/track assembly(ies) 16, 18 of the work vehicle 12. For example, in the embodiment shown in FIG. 1, one wheel slip sensor 62 is positioned on the frame 20 of the work vehicle 12 above one of the rear track assemblies 18 and the other wheel slip sensor 62 is positioned on the frame of the work vehicle 12 above one of the forward track assemblies 16. However, it should be appreciated that the agricultural machine 8 may include any other suitable number of wheel slip sensors 62, such as a single wheel slip sensor 62, positioned at any suitable location on the agricultural machine 8 for generating data indicative of the occurrence of wheel slip of the wheel(s)/track assembly(ies) 16, 18.

Additionally, one or more terrain slope sensors 68 may be positioned on the agricultural machine 8. In general, the terrain slope sensor(s) 68 is configured to generate data indicative of a slope of the terrain over which the agricultural implement 10 traverses. For example, the agricultural machine 8, which includes the implement 10, may ascend a hill/traverse an incline in the direction of travel 14. As such, the terrain slope sensor(s) 68 are configured to generate data indicative of the slope of the incline. Additionally, the agricultural machine 8 may descend a hill/traverse a decline in the direction of travel 14. As such, the terrain slope sensor(s) 68 are configured to generate data indicative of the slope of the decline. The data generated by the terrain slope sensor(s) 68 may, in turn, subsequently be used to determine a selected position for the implement 10 to be steered to.

In general, the terrain slope sensor(s) 68 may correspond to any suitable sensing device(s) configured to generate data indicative of the slope of the terrain over which the implement 10 traverses. For example, in one embodiment, the terrain slope sensor(s) 68 may correspond to an inclinometer(s). However, in alternative embodiments, the terrain slope sensor(s) 68 may correspond to any other suitable sensing device(s), such as a gyroscope(s) and/or the like.

Furthermore, any number of terrain slope sensor(s) 68 may be positioned on the agricultural machine 8 and configured to generate data indicative of the slope of the terrain over which the implement 10 traverses. For example, in the embodiment shown in FIG. 1, the terrain slope sensor 68 is positioned on the implement frame 30 of the implement 10. However, it should be appreciated that the terrain slope sensor(s) 68 may be positioned at any other suitable location on the agricultural machine 8 for generating data indicative of the slope of the terrain over which the implement 10 is traversing.

Figure 2:
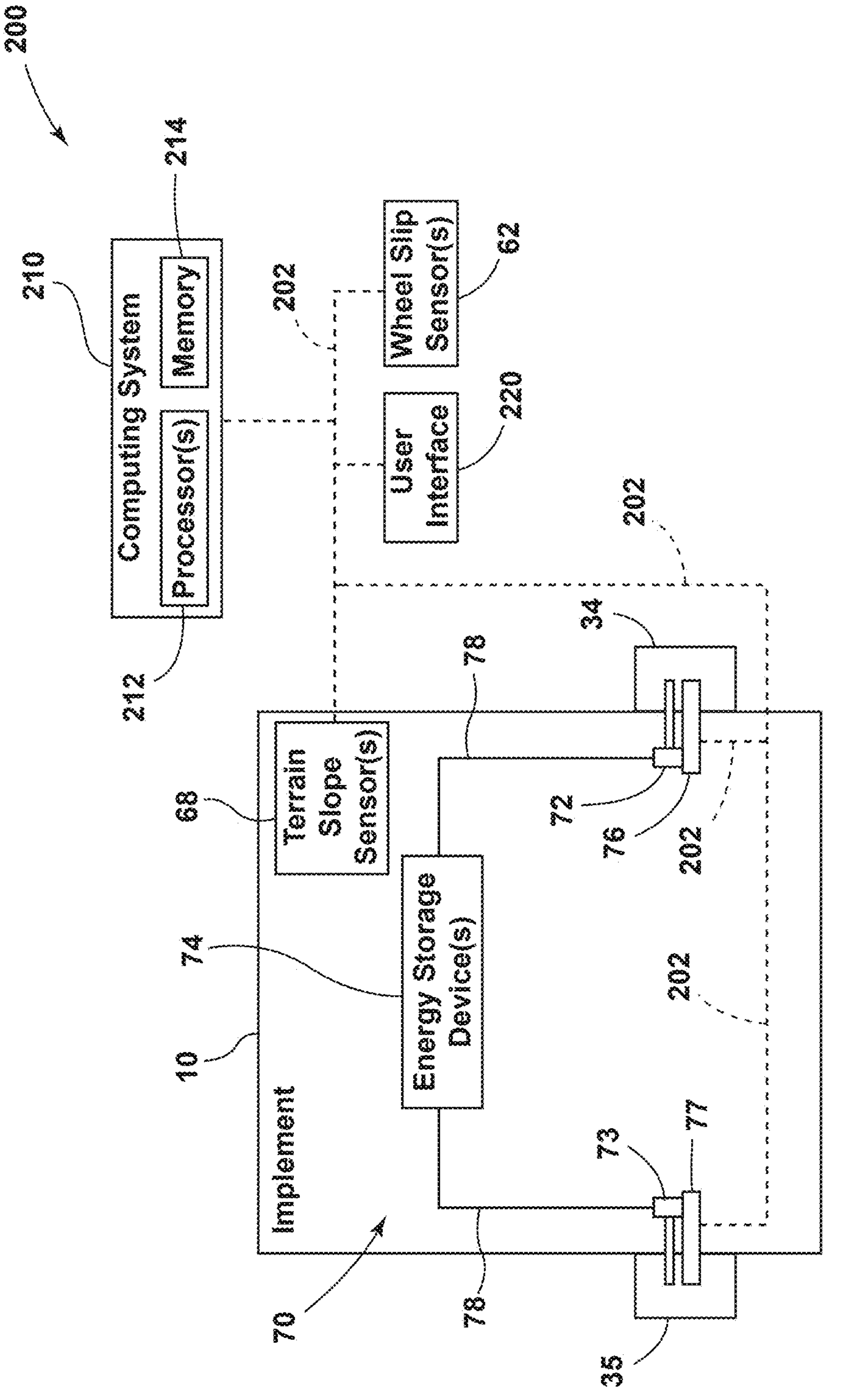
FIG. 2 illustrates a schematic view of one embodiment of a system for controlling the operation of an agricultural implement in accordance with aspects of the present subject matter.

Referring now to FIG. 2, a schematic view of one embodiment of a system 200 for controlling the operation of an agricultural implement is illustrated in accordance with aspects of the present subject matter. In general, the system 200 will be described herein with reference to the agricultural implement 10 and the work vehicle 12 of the agricultural machine 8 described above with reference to FIG. 1. However, the disclosed system 200 may generally be utilized with agricultural implements having any other suitable implement configuration and/or with work vehicles having any other suitable vehicle configuration.

As shown in FIG. 2, the agricultural machine 8 includes a regenerative brake assembly 70. The regenerative brake assembly 70 may be positioned on the implement 10 and include a plurality of electric motors, such as a first electric motor 72 and a second electric motor 73, each for rotating/driving the implement wheels 34, 35 to move the implement 10. As such, the electric motors 72, 73 may assist the engine 24 of the work vehicle 12 in moving the agricultural machine 8 in the direction of travel 14. Each electric motor 72, 73 may be independently operable and configured to drive/rotate the implement wheels 34, 35 independently of each other. In this respect, the first electric motor 72 may drive/rotate the first implement wheel 34 at a different speed than the second electric motor 73 drives/rotates the second implement wheel 35 and vice versa. In the same respect, the first electric motor 72 may drive/rotate the first implement wheel 34 while the second electric motor 73 does not drive/rotate the second implement wheel 35 and vice versa.

Furthermore, the regenerative brake assembly 70 includes one or more energy storage devices 74, such as a chargeable battery(ies). The energy storage device(s) 74 may be electrically coupled to the electric motors 72, 73, for example, via electrical conduit/wiring 78, for providing electric power to and receiving electric power from the electric motors 72, 73. When providing electric power to the electric motors 72, 73, the energy storage device(s) 74 may configured to rotationally drive the electric motors 72, 73, such as a shaft(s) of the electric motors 72, 73, such that the electric motors 72, 73 rotate/drive the implement wheels 34, 35 to move the implement 10. Additionally, the electric motors 72, 73 may be controlled by one or more computing systems to rotate/drive the implement wheels 34, 35.

Moreover, the regenerative brake assembly 70 is configured to steer the implement 10 while generating electrical power to be supplied to the energy storage device(s) 74 while steering the implement 10. As such, the regenerative brake assembly 70 includes one or more regenerative brakes for braking the implement wheels 34, 35 independently of each other to steer the implement 10. For example, the regenerative brake assembly 70 may include a first regenerative brake 76 for braking the first implement wheel 34 to steer the implement 10 in a first direction (as indicated by arrow 28 in FIG. 4) relative to the direction of travel 14 and a second regenerative brake 77 for braking the second implement wheel 35 to steer the implement 10 in a second direction (as indicated by arrow 29 in FIG. 4) different from the first direction 28. The first direction 28 may correspond to one side of the vehicle longitudinal centerline 6 of the work vehicle 12 and the second direction 29 may correspond to the other side of the vehicle longitudinal centerline 6. In this regard, to brake the implement wheels 34, 35 independently of each other to steer the implement 10, the first regenerative brake 76 may brake the first implement wheel 34 while the second regenerative brake 77 does not brake the second implement wheel 35 to steer the implement 10 in the first direction 28. Likewise, to steer the implement in the second direction 29, the second regenerative brake 77 may brake the second implement wheel 35 while the first regenerative brake does not brake the first implement wheel 34. As will be described below, the regenerative brakes 76, 77 may be controlled by one or more computing systems to steer the implement 10.

As the regenerative brake assembly 70 steers the implement 10, the regenerative brake assembly 70 generates electrical power supplied to the energy storage device(s) 74, which may be used by the electric motors 72, 73 to rotate/drive the implement wheels 34, 35. As such, each regenerative brake 76, 77 of the regenerative brake assembly 70 may be associated with one of the electric motors 72, 73. For example, the first regenerative brake 76 may be associated with the first electric motor 72. In this respect, the first regenerative brake 76 may be configured to rotationally drive the first electric motor 72 such that electric power is supplied by the first electric motor 72 to the energy storage device(s) 74 when the first regenerative brake 76 brakes the first implement wheel 34. Likewise, the second regenerative brake 77 may be associated with the second electric motor 73. In this respect, the second regenerative brake 77 may be configured to rotationally drive the second electric motor 73 such that electric power is supplied by the second electric motor 73 to the energy storage device(s) 74 when the second regenerative brake 77 brakes the second implement wheel 35.

As shown in FIG. 2, the system 200 generally includes one or more components of the agricultural implement 10 and/or the work vehicle 12. For example, in the illustrated embodiment, the system 200 includes the wheel slip sensor(s) 62 and the terrain slope sensor(s) 68 of the agricultural machine 8.

Moreover, the system 200 includes a computing system 210 communicatively coupled to one or more components of the agricultural implement 10, the work vehicle 12, and/or the system 200 to allow the operation of such components to be electronically or automatically controlled by the computing system 210. For instance, the computing system 210 may be communicatively coupled to the wheel slip sensor(s) 62 via a communicative link 202. As such, the computing system 210 may be configured to receive data from the wheel slip sensor(s) 62. Additionally, the computing system 210 may be communicatively coupled to the terrain slope sensor(s) 68 via the communicative link 202. In this respect, the computing system 210 may be configured to receive data from the terrain slope sensor(s) 68. Furthermore, the computing system 210 may be communicatively coupled to the regenerative brakes 76, 77 of the regenerative brake assembly 70 via the communicative link 202. In this respect, the computing system 210 may be configured to control the operation of the regenerative brakes 76, 77. In addition, the computing system 210 may be communicatively coupled to any other suitable components of the implement 10, the vehicle 12, and/or the system 200.

In general, the computing system 210 may comprise any suitable processor-based device known in the art, such as a given controller or computing device or any suitable combination of controllers or computing devices. Thus, in several embodiments, the computing system 210 may include one or more processor(s) 212 and associated memory device (s) 214 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 214 of the computing system 210 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 214 may generally be configured to store suitable computer-readable instructions that, when implemented by the processor(s) 212, configure the computing system 210 to perform various computer-implemented functions, such as one or more aspects of the methods and algorithms that will be described herein. In addition, the computing system 210 may also include various other suitable components, such as a communications circuit or module, one or more input/output channels, a data/control bus and/or the like.

It should be appreciated that the computing system 210 may correspond to an existing computing system(s) of the implement 10 and/or the work vehicle 12, itself, or the computing system 210 may correspond to a separate processing device. For instance, in one embodiment, the computing system 210 may form all or part of a separate plug-in module that may be installed in association with the implement 10 and/or work vehicle 12 to allow for the disclosed systems to be implemented without requiring additional software to be uploaded onto existing control devices of the implement 10 and/or work vehicle 12.

Furthermore, it should also be appreciated that the functions of the computing system 210 may be performed by a single processor-based device or may be distributed across any number of processor-based devices, in which instance such devices may be considered to form part of the computing system 210. For instance, the functions of the computing system 210 may be distributed across multiple application-specific controllers or computing devices, such as a navigation controller, an engine computing controller, a transmission controller, an implement controller and/or the like.

In addition, the system 200 may also include a user interface 220. More specifically, the user interface 220 may be configured to provide feedback from the computing system 210 to the operator. As such, the user interface 220 may include one or more feedback devices (not shown), such as display screens, speakers, warning lights, and/or the like, which are configured to provide feedback from the computing system 210 to the operator. As such, the user interface 220 may, in turn, be communicatively coupled to the computing system 210 via the communicative link 202 to permit the feedback to be transmitted from the computing system 210 to the user interface 220. Furthermore, some embodiments of the user interface 220 may include one or more input devices, such as touchscreens, keypads, touchpads, knobs, buttons, sliders, switches, mice, microphones, and/or the like, which are configured to receive inputs from the operator. In one embodiment, the user interface 220 may be mounted or otherwise positioned within the cab 22 of the work vehicle 12. However, in alternative embodiments, the user interface 220 may mounted at any other suitable location.

Figure 3:
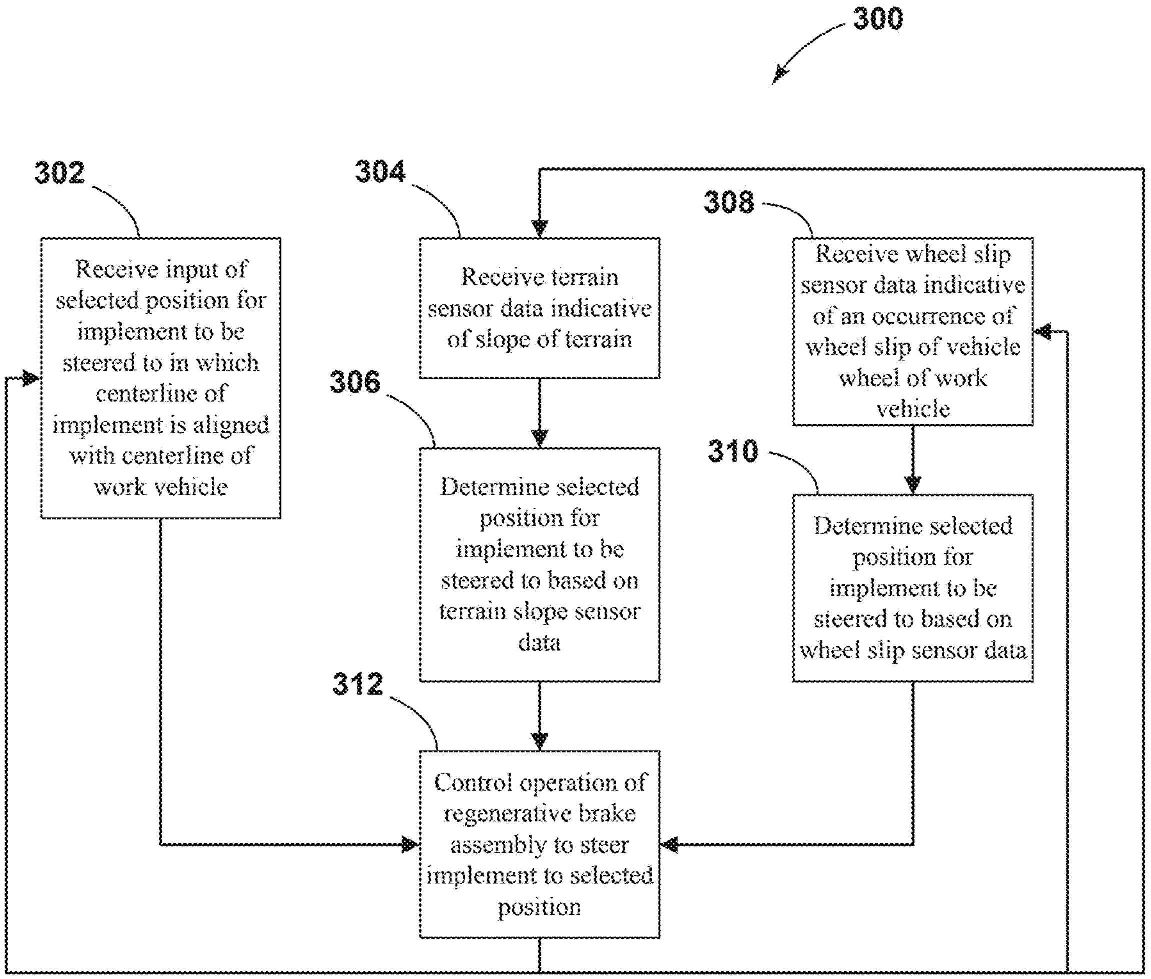
FIG. 3 illustrates a flow diagram of one embodiment of example control logic for controlling the operation of an agricultural implement in accordance with aspects of the present subject matter.

Referring now to FIG. 3, a flow diagram of one embodiment of control logic 300 that may be executed by the computing system 210 (or any other suitable computing system) for controlling the operation of an agricultural implement is illustrated in accordance with aspects of the present subject matter. Specifically, the control logic 300 shown in FIG. 3 is representative of steps of one embodiment of an algorithm that can be executed to control the operation of the regenerative brake assembly 70 to steer the agricultural implement 10 to a selected position. Thus, in several embodiments, the control logic 300 may be advantageously utilized in association with a system installed on or forming part of an agricultural implement to allow for real-time control of a regenerative brake assembly to steer an agricultural implement without requiring substantial computing resources and/or processing time. However, in other embodiments, the control logic 300 may be used in association with any other suitable system, application, and/or the like for controlling the operation of an agricultural implement.

As shown in FIG. 3, at (302), the control logic 300 includes receiving an input of a selected position for an agricultural implement to be steered to in which a longitudinal centerline of the agricultural implement is aligned with a longitudinal centerline of a work vehicle configured to tow the agricultural implement as the agricultural implement moves in a direction of travel. Specifically, as mentioned above, in several embodiments, the computing system 210 is communicatively coupled to the user interface 220 via the communicative link 202. In this respect, the computing system 210 may receive the input from the user interface 220, such as input from the operator of the agricultural machine 8, of the selected position for the implement 10 to be steered to in which the implement longitudinal centerline 4 (FIG. 1) of the implement 10 is aligned with the vehicle longitudinal centerline 6 (FIG. 1) of the work vehicle 12. Additionally, or alternatively to (302), the control logic 300 may begin at (304) and/or (308). Otherwise, the control logic 300 proceeds to (312).

Additionally, at (304), the control logic 300 includes receiving terrain sensor data indicative of a slope of a terrain over which the agricultural implement traverses. Specifically, as mentioned above, in several embodiments, the computing system 210 is communicatively coupled to the terrain slope sensor(s) 68 via the communicative link 202. In this respect, as the implement 10 travels across a field or to perform an agricultural operation thereon or across a different area, such as a road, the computing system 210 may receive data from the terrain slope sensor(s) 68 indicative of the slope of terrain over which the implement 10 is traversing. The slope of the terrain may correspond to an incline/decline. Additionally, or alternatively to (304), the control logic 300 may begin at (302) and/or (308). Otherwise, the control logic 300 proceeds to (306).

Furthermore, at (306), the control logic 300 includes determining the selected position to which the agricultural implement to be steered based on the received terrain slope sensor data. Specifically, in several embodiments, the computing system 210 is configured to determine the selected position for the implement 10 to be steered to based on the terrain slope sensor data received at (304). For example, in one embodiment, the computing system 210 may access a look-up table(s) stored within its memory device(s) 214 that correlates the terrain slope sensor data received at (304) to terrain slope value(s). The terrain slope value(s) may correspond to an incline/decline over which the implement 10 is traversing. When the implement 10 is traversing the incline/decline/the implement 10 may tend to slide down the incline/decline. In this regard, the computing system 210 may determine that the selected position is a position in which the implement 10 should be steered toward to reduce or prevent the implement 10 from sliding down the incline/decline. Thereafter, the control logic 300 proceeds to (312).

Additionally, at (308), the control logic 300 includes receiving wheel slip sensor data indicative of a slope of an occurrence of a wheel slip of a vehicle wheel of the work vehicle configured to tow the agricultural implement relative to the ground. Specifically, as mentioned above, in several embodiments, the computing system 210 is communicatively coupled to the wheel slip sensor(s) 62 via the communicative link 202. In this respect, as the implement 10 travels across a field or to perform an agricultural operation thereon or across a different area, such as a road, the computing system 210 may receive data from the wheel slip sensor(s) 62 indicative of the occurrence of the wheel slip of one or more of the wheels/track assemblies 16, 18 of the work vehicle 12 relative to the ground. Additionally, or alternatively to (308), the control logic 300 may begin at (302) and/or (304). Otherwise, the control logic 300 proceeds to (310).

Furthermore, as shown in FIG. 3, at (310), the control logic 300 includes determining the selected position to which the agricultural implement to be steered based on the received wheel slip sensor data. Specifically, in several embodiments, the computing system 210 is configured to determine the selected position to which the implement 10 to be steered based on the wheel slip sensor data received at (308). For example, in one embodiment, the computing system 210 may access a look-up table(s) stored within its memory device(s) 214 that correlates the wheel slip sensor data received at (308) to wheel slip value(s). The wheel slip value(s) may correspond to the occurrence of wheel slip of one or more of the wheels/track assemblies 16, 18 of the work vehicle 12. When the work vehicle 12 is traversing a field with wet or muddy soil conditions or a wet road, one or more of the wheels/track assemblies 16, 18 of the work vehicle 12 may slip or rotate with little to no corresponding translational motion of the work vehicle 12. In this regard, the computing system 210 may determine that the selected position is a position in which the implement 10 should be steered to avoid or reduce the likelihood that the implement 10 being towed by the work vehicle 12 will encounter the same conditions creating the wheel slip of the wheels/track assemblies 16, 18 of the work vehicle 12. Thereafter, the control logic 300 proceeds to (312).

Figure 4:
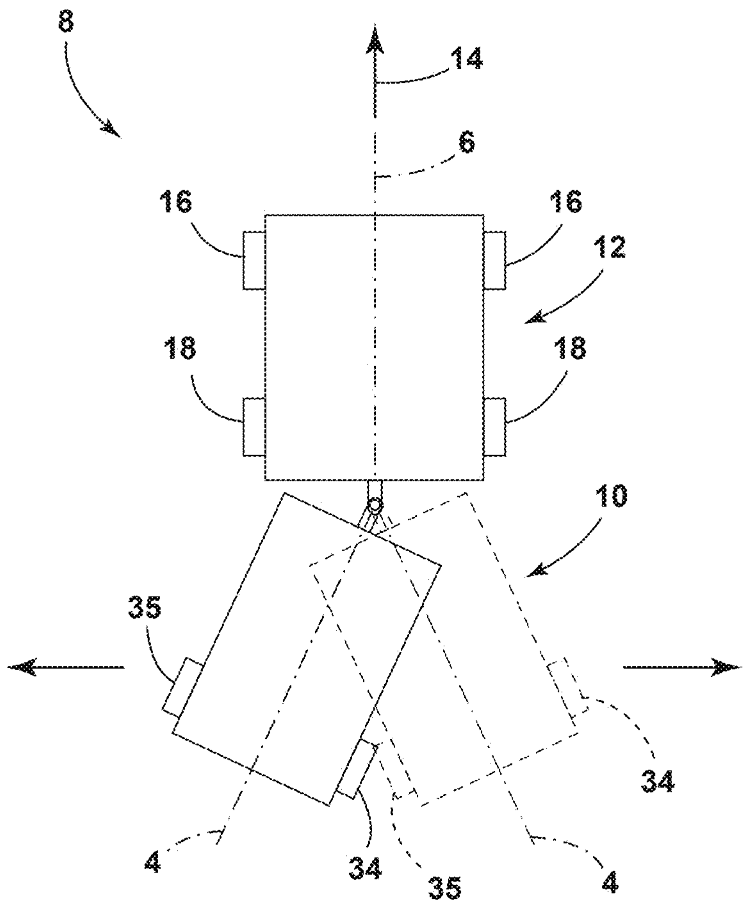
FIG. 4 illustrates a top view of the agricultural machine shown in FIG. 1 with the agricultural implement in various positions relative to a longitudinal centerline of a work vehicle of the agricultural machine.

Moreover, at (312), the control logic 300 includes controlling the operation of a regenerative brake assembly to steer the agricultural implement to the selected position. Specifically, as mentioned above, in several embodiments, the computing system 210 is communicatively coupled to the first regenerative brake 76 and the second regenerative brake 77 of the regenerative brake assembly 70. In this respect, after receipt of the input of the selected position at (302), the determination of the selected position at (306) based on the terrain slope sensor data received at (304), and/or the determination of the selected position at (310) based on the wheel slip sensor data received at (308), the computing system 210 is configured to control the operation of the first regenerative brake 76 and/or the second regenerative brake 77 to brake the first implement wheel 34 and/or the second implement wheel 35 respectively to steer the implement 10 to the selected position. For example, as shown in FIG. 4, as the implement 10 traverses the field, the implement longitudinal centerline 4 of the implement 10 may become misaligned with the vehicle longitudinal centerline 6 of the work vehicle 12 as the implement 10 drifts to one side or the other side of the vehicle longitudinal centerline 6. As such, the computing system 210 may control the operation of the first regenerative brake 76 and/or the second regenerative brake 77 to steer the implement 10 the selected position such that the longitudinal centerlines 4, 6 are aligned.

Additionally, as the regenerative brakes 76, 77 brake the implement wheels 34, 35 and, thus, the implement 10 is steered, electrical power is generated by the regenerative brakes 76, 77 during braking operations by rotating the electrical motors 72, 73. The electrical power generated is then stored by the energy storage device(s) 74 for later use. For example, the energy stored may later be used by the electric motors 72, 73 to assist the engine 24 of the work vehicle 12 drive the agricultural machine 8 by providing power to drive the implement wheels 34, 35 of the implement 10. Thereafter, the control logic 300 returns to (302), (304), and/or (308).

Figure 5:
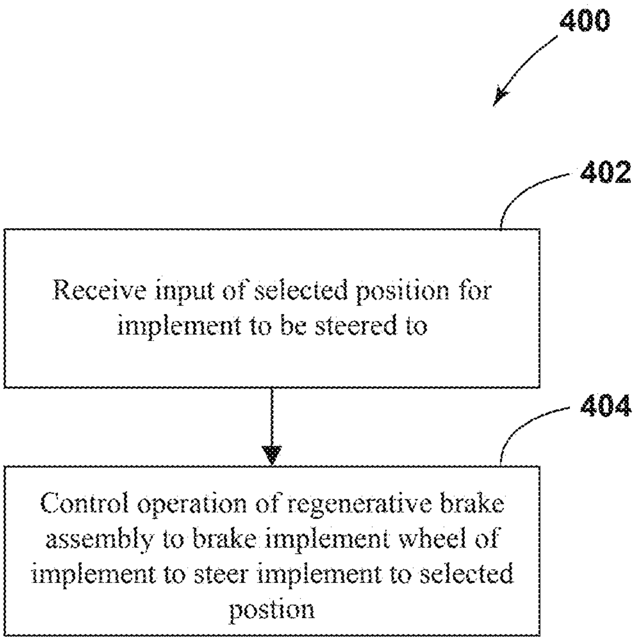
FIG. 5 illustrates a flow diagram of one embodiment of a method for controlling the operation of an agricultural implement in accordance with aspects of the present subject matter.

Referring now to FIG. 5, a flow diagram of one embodiment of a method 400 for controlling the operation of an agricultural implement is illustrated in accordance with aspects of the present subject matter. In general, the method 400 will be described herein with reference to the agricultural implement 10, the work vehicle 12, and the system 200 described above with reference to FIGS. 1-4. However, it should be appreciated by those of ordinary skill in the art that the disclosed method 400 may generally be implemented with any agricultural implements having any suitable implement configuration, work vehicles having any suitable vehicle configuration, and/or within any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (402), the method 400 includes receiving, with a computing system, an input of a selected position for an agricultural implement to be steered to as the agricultural implement moves in a direction of travel. For instance, as described above, the computing system 210 may be configured to receive the input, such as operator input from the user interface 220 or input of the selected position as determined by the computing system 210 based on received sensor data, of the selected position for the agricultural implement 10 to be steered to as the agricultural implement 10 moves in the direction of travel 14.

Additionally, at (404), the method 400 includes controlling, with the computing system, an operation of a regenerative brake assembly to brake an implement wheel of the agricultural implement to steer the agricultural implement to the selected position. For instance, as described above, the computing system 210 may be configured to control the operation of the regenerative brake assembly 70 to brake the first implement wheel 34 and/or the second implement wheel 35 of the agricultural implement 10 to steer the agricultural implement 10 to the selected position.

It is to be understood that the steps of the control logic 300 and the method 400 are performed by the computing system 210 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 210 described herein, such as the control logic 300 and the method 400, is implemented in software code or instructions which are tangibly stored on a tangible computer readable medium. The computing system 210 loads the software code or instructions via a direct interface with the computer readable medium or via a wired and/or wireless network. Upon loading and executing such software code or instructions by the computing system 210, the computing system 210 may perform any of the functionality of the computing system 210 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural machine, comprising:

a work vehicle including a vehicle wheel configured to move the work vehicle in a direction of travel;

an agricultural implement configured to be towed by the work vehicle in the direction of travel, the agricultural implement including a first implement wheel and a second implement wheel configured to move the agricultural implement in the direction of travel;

a regenerative brake assembly including an energy storage device, the regenerative brake assembly configured to steer the agricultural implement and to generate electrical power supplied to the energy storage device;

a wheel slip sensor configured to generate data indicative of an occurrence of a wheel slip of the vehicle wheel relative to the ground; and a computing system communicatively coupled to the regenerative brake assembly and the wheel slip sensor, the computing system configured to:

determining a selected position for the agricultural implement to be steered to as the agricultural implement moves in the direction of travel based on the data generated by the wheel slip sensor; and control an operation of the regenerative brake assembly to steer the agricultural implement to the selected position by independently braking the first implement wheel to steer the agricultural implement in a first direction and by independently braking the second implement wheel to steer the agricultural implement in a second direction different from the first direction, wherein the electrical power supplied to the energy storage device is generated by the regenerative brake assembly as the regenerative brake assembly steers the agricultural implement.

2. The agricultural machine of claim 1, wherein:

the electrical power supplied to the energy storage device is generated by the regenerative brake assembly as the regenerative brake assembly brakes the first or second implement wheel.

3. The agricultural machine of claim 2, wherein:

the regenerative brake assembly is configured to brake the first implement wheel and the second implement wheel independently of each other to steer the agricultural implement; and the electrical power supplied to the energy storage device is generated by the regenerative brake assembly as the regenerative brake assembly brakes the first implement wheel and the second implement wheel independently of each other.

4. The agricultural machine of claim 1, wherein the regenerative brake assembly further comprises:

an electric motor configured to drive the first or second implement wheel, the electric motor electrically coupled to the energy storage device for receiving the electrical power from the energy storage device.

5. The agricultural machine of claim 4, wherein:

the regenerative brake assembly further comprises a regenerative brake configured to brake the first or second implement wheel; and when braking the first or second implement wheel, the regenerative brake rotationally drives the electric motor such that electric power is supplied by the electric motor to the energy storage device.

6. A system for controlling the operation of an agricultural implement, the system comprising:

a vehicle wheel of a work vehicle configured to move the work vehicle in a direction of travel;

an agricultural implement configured to be towed by the work vehicle in the direction of travel, the agricultural implement including a first implement wheel and a second implement wheel configured to move the agricultural implement in the direction of travel;

a regenerative brake assembly including an energy storage device, the regenerative brake assembly configured to steer the agricultural implement and to generate electrical power supplied to the energy storage device;

a wheel slip sensor configured to generate data indicative of an occurrence of a wheel slip of the vehicle wheel relative to the ground; and a computing system communicatively coupled to the regenerative brake assembly and the wheel slip sensor, the computing system configured to:

receive an input of a selected position for the agricultural implement to be steered to as the agricultural implement moves in the direction of travel, wherein receiving the input comprises determining the selected position based on the data generated by the wheel slip sensor; and control an operation of the regenerative brake assembly to steer the agricultural implement to the selected position by independently braking the first implement wheel to steer the agricultural implement in a first direction and by independently braking the second implement wheel to steer the agricultural implement in a second direction different from the first direction, and wherein, the electrical power supplied to the energy storage device is generated by the regenerative brake assembly as the regenerative brake assembly steers the agricultural implement to the selected position.

7. The system of claim 6, wherein:

the electrical power supplied to the energy storage device is generated by the regenerative brake assembly as the regenerative brake assembly brakes the first or second implement wheel.

8. The system of claim 7, wherein:

the electrical power supplied to the energy storage device is generated by the regenerative brake assembly as the regenerative brake assembly brakes the first implement wheel and the second implement wheel independently of each other.

9. The system of claim 6, wherein, when receiving the input of the selected position, the computing system is configured to:

receive an input of a selected position for the agricultural implement to be steered in which a longitudinal centerline of the agricultural implement is aligned with a longitudinal centerline of the work vehicle.

10. The system of claim 6, further comprising:

a terrain slope sensor configured to generate data indicative of a slope of a terrain over which the agricultural implement traverses, and wherein:

the computing system is communicatively coupled to the terrain slope sensor; and when receiving the input of the selected position, the computing system is configured to:

determine the selected position for the agricultural implement to be steered to based on the data generated by the terrain slope sensor.

11. The system of claim 6, wherein the regenerative brake assembly further comprises:

an electric motor configured to drive the first or second implement wheel, the electric motor electrically coupled to the energy storage device for receiving the electrical power from the energy storage device.

12. The system of claim 11, wherein:

the regenerative brake assembly further comprises a regenerative brake configured to brake the first or second implement wheel; and when braking the first or second implement wheel, the regenerative brake rotationally drives the electric motor such that electric power is supplied by the electric motor to the energy storage device.

13. A method for controlling the operation of an agricultural implement, the method comprising:

receiving, with a computing system, wheel slip sensor data indicative of an occurrence of a wheel slip of a vehicle wheel of the work vehicle towing the agricultural implement relative to the ground;

receiving, with the computing system, an input of a selected position for an agricultural implement to be steered to as the agricultural implement moves in a direction of travel, wherein receiving the input of the selected position comprises determining the selected position based on the received wheel slip sensor data; and controlling, with the computing system, an operation of a regenerative brake assembly to steer the agricultural implement to the selected position by independently braking a first implement wheel of the agricultural implement to steer the agricultural implement in a first direction and by independently braking a second implement wheel of the agricultural implement to steer the agricultural implement in a second direction different from the first direction.

14. The method of claim 13, further comprising:

when receiving the input of the selected position, receiving, with the computing system, an input of a selected position for the agricultural implement to be steered in which a longitudinal centerline of the agricultural implement is aligned with a longitudinal centerline of a work vehicle configured to tow the agricultural implement.

15. The method of claim 13, further comprising:

receiving, with the computing system, terrain slope sensor data indicative of a slope of a terrain over which the agricultural implement traverses; and when receiving the input of the selected position, determining, with the computing system, the selected position for the agricultural implement to be steered to based on the received terrain slope sensor data.

* * * * *